United States Patent
Nakamura et al.

(10) Patent No.: US 9,926,845 B2
(45) Date of Patent: Mar. 27, 2018

(54) COMBUSTOR AND GAS TURBINE

(71) Applicant: MITSUBISHI HEAVY INDUSTRIES, LTD., Tokyo (JP)

(72) Inventors: Sosuke Nakamura, Tokyo (JP); Yoshikazu Matsumura, Tokyo (JP); Hikaru Katano, Tokyo (JP); Kenta Taniguchi, Tokyo (JP); Hiroyuki Yamasaki, Yokomaha (JP)

(73) Assignee: MITSUBISHI HITACHI POWER SYSTEMS, LTD., Yokohama-shi (JP)

( * ) Notice: Subject to any disclaimer, the term of this patent is extended or adjusted under 35 U.S.C. 154(b) by 738 days.

(21) Appl. No.: 13/687,587

(22) Filed: Nov. 28, 2012

(65) Prior Publication Data
US 2013/0219898 A1 Aug. 29, 2013

Related U.S. Application Data

(63) Continuation of application No. PCT/JP2012/054935, filed on Feb. 28, 2012.

(51) Int. Cl.
*F23R 3/00* (2006.01)
*F02C 7/22* (2006.01)
(Continued)

(52) U.S. Cl.
CPC .............. *F02C 7/22* (2013.01); *F23D 11/24* (2013.01); *F23D 11/38* (2013.01); *F23R 3/00* (2013.01);
(Continued)

(58) Field of Classification Search
CPC ...... F02C 7/22; F23R 3/28; F23R 3/00; F23D 11/24; F23K 2900/05001;
(Continued)

(56) References Cited

U.S. PATENT DOCUMENTS 4,138,842 A * 2/1979 Zwick ............................. 60/737
4,589,260 A * 5/1986 Krockow .................. F23R 3/36
60/737
(Continued)

FOREIGN PATENT DOCUMENTS

| CN | 1111011 A | 11/1995 |
| CN | 1860333 A | 11/2006 |

(Continued)

OTHER PUBLICATIONS

Tsuji et al "High Temperature Air Combustion," 2003, pp. 85-86.*
(Continued)

*Primary Examiner* — Ted Kim
(74) *Attorney, Agent, or Firm* — Westerman, Hattori, Daniels & Adrian, LLP

(57) ABSTRACT

A combustor according to the invention includes a combustor basket to which air A is supplied from the outside, a plurality of first nozzles that are annularly provided along the inner periphery of the combustor basket and that supply premixed gas M of the air and fuel to the inside of the combustor basket, and a transition piece in which the combustor basket is connected to a base end thereof and which burns the premixed gas supplied from the first nozzles, thereby forming a flame front spread to the outer periphery side toward the leading end in an axial direction, wherein each first nozzle supplies the premixed gas with fuel concentration changed around the center axis of the first nozzle such that the flame front has a uniform temperature in the axial direction.

9 Claims, 9 Drawing Sheets

(51) Int. Cl.
*F23R 3/28* (2006.01)
*F23D 11/24* (2006.01)
*F23D 11/38* (2006.01)

(52) U.S. Cl.
CPC ...... *F23R 3/28* (2013.01); *F23D 2900/00016* (2013.01); *F23D 2900/00018* (2013.01); *F23K 2900/05001* (2013.01); *F23K 2900/05141* (2013.01)

(58) Field of Classification Search
CPC . F23K 2900/05141; F23K 2900/00018; F23K 2900/00016
See application file for complete search history.

(56) References Cited

U.S. PATENT DOCUMENTS

| | | | | |
|---|---|---|---|---|
| 5,259,184 | A * | 11/1993 | Borkowicz | F23R 3/28 60/39.55 |
| 5,836,164 | A * | 11/1998 | Tsukahara | F23R 3/346 60/733 |
| 6,068,467 | A * | 5/2000 | Mandai | F23D 14/02 431/174 |
| 6,070,411 | A * | 6/2000 | Iwai et al. | 60/737 |
| 6,105,372 | A * | 8/2000 | Mandai | F23R 3/10 60/755 |
| 6,267,583 | B1 | 7/2001 | Mandai et al. | |
| 6,684,641 | B2 * | 2/2004 | Moriya et al. | 60/737 |
| 7,137,258 | B2 * | 11/2006 | Widener | 60/776 |
| 7,546,736 | B2 * | 6/2009 | Amond, III | F02C 9/34 60/747 |
| 2001/0020364 | A1 * | 9/2001 | Sato | F23R 3/343 60/746 |
| 2001/0052229 | A1 * | 12/2001 | Tuthill | F23D 14/02 60/776 |
| 2002/0011070 | A1 * | 1/2002 | Mandai et al. | 60/737 |
| 2003/0000216 | A1 * | 1/2003 | Akagi | F23R 3/002 60/746 |
| 2003/0014975 | A1 * | 1/2003 | Nishida | F23R 3/286 60/737 |
| 2004/0060297 | A1 * | 4/2004 | Koenig | F23R 3/286 60/737 |
| 2006/0070237 | A1 * | 4/2006 | Johnson | F23R 3/286 60/740 |
| 2008/0289341 | A1 * | 11/2008 | Ishizaka et al. | 60/748 |
| 2009/0031728 | A1 | 2/2009 | Miura et al. | |
| 2010/0064691 | A1 * | 3/2010 | Laster | F23R 3/286 60/737 |
| 2010/0221441 | A1 * | 9/2010 | Morimoto et al. | 427/387 |
| 2010/0269508 | A1 * | 10/2010 | Saito et al. | 60/748 |
| 2012/0282558 | A1 * | 11/2012 | Kraemer et al. | 431/9 |

FOREIGN PATENT DOCUMENTS

| | | |
|---|---|---|
| EP | 1 543 272 A1 | 6/2005 |
| EP | 1 605 208 A1 | 12/2005 |
| JP | 8-303779 A | 11/1996 |
| JP | 9-210362 A | 8/1997 |
| JP | 2000-55367 A | 2/2000 |
| JP | 2001-254947 A | 9/2001 |
| JP | 2002-195562 A | 7/2002 |
| JP | 2006-336995 A | 12/2006 |
| JP | 2007-501926 A | 2/2007 |
| JP | 2007-285572 A | 11/2007 |
| KR | 10-1999-0072562 A | 9/1999 |
| KR | 10-1999-0072652 A | 9/1999 |
| WO | 2004/029515 A1 | 4/2004 |

OTHER PUBLICATIONS

International Search Report of PCT/JP2012/081106, dated Feb. 12, 2013, w/English translation.
International Search Report of PCT/JP2012/054935, dated May 15, 2012.
Written Opinion of PCT/JP2012/054935, dated May 15, 2012.
Extended European Search Report dated Aug. 28, 2015, issued in counterpart European Patent Application No. 12869701.8 (7 pages).
Notice of Preliminary Rejection dated Sep. 16, 2015, issued in counterpart Korean Patent Application No. 10-2014-7023989, w/English translation (12 pages).
Office Action dated May 4, 2015, issued in counterpart Chinese application No. 201280070543.X (w/English translation) (19 pages).
Written Opinion dated Feb. 12, 2013, issued in counterpart Application No. PCT/JP2012/081106, with English translation. (4 pages).
Notice of Allowance dated Aug. 12, 2016, issued in counterpart Korean Application No. 10-2014-7023989, with English translation. (4 pages).

* cited by examiner

COMBUSTOR AND GAS TURBINE

TECHNICAL FIELD

The present invention relates to a combustor and a gas turbine.

Priority is claimed on PCT/JP2012/054935 filed on Feb. 28, 2012, the contents of which are incorporated herein by reference.

BACKGROUND ART

In the past, in the field of gas turbines, there has been a gas turbine that uses a premixed combustion type combustor as a combustor that blows fuel into compressed air, thereby performing combustion. As the premixed combustion type combustor, there is a combustor that includes a combustor basket to which compressed air is supplied from a compressor, a plurality of main nozzles annularly disposed along the inner periphery of the combustor basket, and a pilot nozzle that is disposed on the center axis of the combustor basket and that holds a pilot flame. This type of combustor performs premixed combustion by supplying premixed gas of fuel and compressed air to the inside of the combustor basket by the main nozzles and igniting the premixed gas using the pilot flame.

For example, in Patent Document 1 below, a premixed combustion burner is constituted of a fuel nozzle, a burner cylinder that surrounds the fuel nozzle so as to form an air pathway between the burner cylinder and the fuel nozzle, and a swirler that is disposed at plural places in the circumferential direction of the outer peripheral surface of the fuel nozzle and which swirls air flowing therethrough. In this combustor, a vortical air flow is generated on the downstream of the swirler by forming a cutout portion in a trailing edge portion on the inner periphery of the swirler, and thus the fuel concentration of the premixed gas is made uniform in the radial direction of the air pathway, whereby suppression of an increase in NOx and prevention of reversion (flashback) of a flame are attempted.

PRIOR ART DOCUMENT

Patent Document

Patent Document 1: Japanese Unexamined Patent Application, First Publication No. 2007-285572

DISCLOSURE OF THE INVENTION

Problems That the Invention is to Solve

Incidentally, in the combustor as described above, usually, cooling of the combustor basket, a transition piece, and a peripheral member thereof is attained by making cooling air flow along the inner peripheral surface of the combustor basket or the transition piece or blowing cooling air thereon. Further, the combustor has a structure in which cooling air flows to a space that is formed between the burner cylinder of a plurality of main nozzles and a pilot cone that is disposed outside the pilot nozzle.

However, in the combustor of the related art, even if the fuel concentration of the premixed gas in an outlet end portion of the burner cylinder is made uniform in the radial direction, since the cooling air is mixed therein before reaching a flame front, fuel concentration at the flame front does not become uniform, and thus there is a possibility that a section where fuel concentration becomes locally high may be created. Here, thermal NOx that depends on flame temperature in combustion increases exponentially with respect to a rise in the flame temperature. Therefore, if a section is created where the temperature of a flame becomes locally high due to a locally high fuel concentration, there is a problem in that NOx increases.

The present invention has been made in consideration of such circumstances and has an object of suppressing the generation of NOx in a combustor and a gas turbine.

Means for Solving the Problems

According to an aspect of the invention, there is provided a combustor including: a combustor basket to which air is supplied from the outside; a first nozzle that extends in an axial direction of the combustor basket, that is provided in a plurality at intervals along an inner periphery of the combustor basket, and that supplies premixed gas of the air and fuel to the inside of the combustor basket; and a transition piece in which the combustor basket is connected to a base end thereof and which burns the premixed gas supplied from the first nozzles, thereby forming a flame front; wherein each of the first nozzles supplies the premixed gas with fuel concentration changed around a center axis of the first nozzle such that the flame front has a uniform temperature in an axial direction.

According to this configuration, since each of the first nozzles supplies the premixed gas with fuel concentration changed around the center axis thereof such that the flame front has a uniform temperature in the axial direction, even if cooling air is mixed in the premixed gas, it is possible to reduce the variance in the fuel concentration of the premixed gas over the axial direction. Thus, the flame front is formed by the premixed gas having a fuel concentration that is uniform over the axial direction, so it is possible to suppress combustion of the flame front at a non-uniform temperature in the axial direction and also suppress the generation of NOx.

The first nozzle may be configured such that, in a leading end outlet of the first nozzle, a fuel concentration of the premixed gas in a second area located radially inward of the inside of the combustor basket is higher than that in a first area located radially outward of the inside of the combustor basket.

That is, for example, in a case where the fuel concentration of the premixed gas that is supplied from the first nozzle is affected by the cooling air that flows between the first nozzle and a second nozzle that is provided inside the first nozzle, since the fuel concentration of the premixed gas that is supplied from the first nozzle is relatively less likely to decrease in the first area and relatively more likely to decrease in the second area, the fuel concentration in the second area is set to be relatively higher than that in the first area. Thus, it is possible to make the fuel concentration of the premixed gas that reaches the flame front uniform in the axial direction with a relatively simple configuration.

In this specification, the first area of the premixed gas located radially outward of the inside of the combustor basket indicates that, of the premixed gas generated by one first nozzle, a part of or the whole of the area located radially outward of the inside of the combustor basket constitutes the first area. The first area is not necessarily the whole of the area located radially outward of the inside of the combustor basket. Similarly, the second area of the premixed gas located radially inward of the inside of the combustor basket indicates that a part of or the whole of the area located radially inward of the inside of the combustor basket constitutes the second area.

Also, the first nozzle may be configured such that, in a leading end outlet of the first nozzle, a fuel concentration of the premixed gas in a first area located radially outward of the inside of the combustor basket is relatively higher than that in a second area located radially inward of the inside of the combustor basket.

That is, for example, in a case where the fuel concentration of the premixed gas that is supplied from the first nozzle is affected by the cooling air that flows on the inner peripheral surface of the combustor basket or a transition piece, since the fuel concentration of the premixed gas that is supplied from the first nozzle is relatively more likely to decrease in the first area and relatively less likely to decrease in the second area, the fuel concentration in the first area is set to be relatively higher than that in the second area. Thus, it is possible to make the fuel concentration of the premixed gas that reaches the flame front uniform in the axial direction with a relatively simple configuration.

Further, the first nozzle may have a nozzle body provided on the center axis of the first nozzle, and a plurality of fuel discharge sections that is provided at an outer periphery of the nozzle body and discharges the fuel, and the plurality of fuel discharge sections may discharge the fuel with a discharge quantity changed around the center axis of the first nozzle.

According to this configuration, since the plurality of fuel discharge sections discharges the fuel with a discharge quantity changed around the center axis of the first nozzle, the fuel concentration of the premixed gas can be easily changed around the center axis of the first nozzle.

Further, each of the plurality of fuel discharge sections may have a fuel discharge hole, and a discharge quantity of the fuel may be changed by varying opening areas of the fuel discharge holes.

According to this configuration, since the number of fuel discharge holes is different, it is possible to change the fuel concentration of the premixed gas by changing the discharge quantity of the fuel with a relatively simple configuration.

Further, each of the plurality of fuel discharge sections may have a fuel discharge hole, and a discharge quantity of the fuel may be changed by varying the number of fuel discharge holes.

According to this configuration, since the opening areas of the fuel discharge holes are different, it is possible to change the fuel concentration of the premixed gas by changing the discharge quantity of the fuel with a relatively simple configuration.

Further, each of the plurality of fuel discharge sections may have a fuel discharge hole, the fuel discharge holes may be divided into a plurality of groups, and each group may be connected to an independent fuel supply path, thereby changing the discharge quantity of the fuel.

According to this configuration, since the fuel discharge holes are divided into the plurality of groups and each group is connected to the independent fuel supply path, a fuel discharge quantity of each group is arbitrarily changed by controlling, for example, fuel supply pressure of each fuel supply path, and eventually, the fuel concentration of the premixed gas or the fuel concentration ratio between the respective groups can be changed. Further, even at the time of operation, it is possible to arbitrarily change the fuel discharge quantity of each group or the fuel concentration ratio between the respective groups.

Further, the first nozzle may have a swirler blade that is provided in a plurality at an outer periphery of the nozzle body and forms a swirl flow of the premixed gas, and the plurality of fuel discharge sections may be formed at the swirler blade.

According to this configuration, since the plurality of fuel discharge sections is formed at the swirler blade, a swirl flow is formed in the premixed gas and as a result, the fuel concentration of the premixed gas can be efficiently adjusted in the radial direction.

Further, the swirler blade may have the fuel discharge sections at a plurality of positions in a radial direction of the nozzle body, and the plurality of fuel discharge sections may discharge the fuel with a discharge quantity changed in the radial direction of the nozzle body.

According to this configuration, since the plurality of fuel discharge sections discharges the fuel with a discharge quantity changed in the radial direction of the nozzle body, the fuel concentration of the premixed gas can be adjusted in the radial direction.

In addition, according to another aspect of the invention, there is provided a gas turbine including: a compressor, a combustor, and a turbine, wherein the combustor may be any of the above-described combustors.

According to this configuration, since any of the above-described combustors is provided, a gas turbine can be configured in which the generation of NOx is suppressed.

Effects of the Invention

According to the combustor related to the invention, the generation of NOx can be suppressed.

According to the gas turbine related to the invention, a gas turbine can be configured in which the generation of NOx is suppressed.

BEST MODE FOR CARRYING OUT THE INVENTION (First Embodiment)

Hereinafter, a first embodiment of the invention will be described with reference to the drawings.

Figure 1:
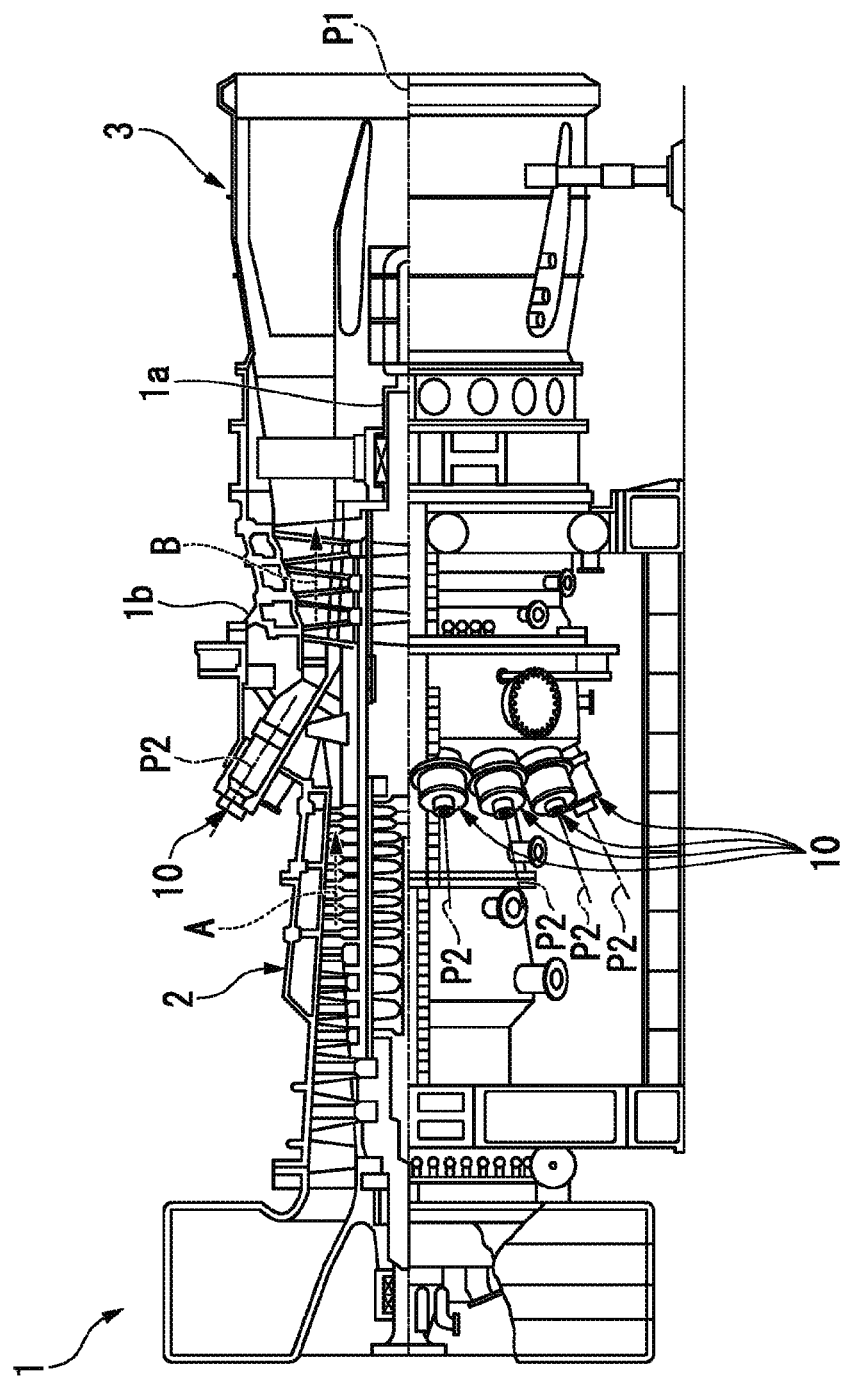
FIG. 1 is a schematic cross-sectional view showing the overall configuration of a gas turbine 1 related to a first embodiment of the invention.

FIG. 1 is a schematic cross-sectional view showing the overall configuration of a gas turbine 1 related to an embodiment of the invention.

As shown in FIG. 1, the gas turbine 1 is schematically configured by a compressor 2, a plurality of combustors 10, and a turbine 3.

The compressor 2 takes in air as working fluid and generates compressed air (air) A.

The plurality of combustors 10 communicates with an outlet of the compressor 2, as shown in FIG. 1, and mixes fuel with the compressed air A supplied from the compressor 2 and also burns the mixture, thereby generating high-temperature and high-pressure combustion gas B.

The turbine 3 converts the thermal energy of the combustion gas B sent thereto from the combustor 10 into the rotational energy of a rotor 1a. Then, the rotational energy is transmitted to an electric generator (not shown) connected to the rotor 1a.

In addition, the respective combustors 10 are radially disposed in a state where a combustor center axis P2 of each combustor is inclined such that the inlet side of the combustor 10 is on the radially farther side than the outlet side with respect to a center axis P1 of rotation of the rotor 1a in the gas turbine 1.

Figure 2:
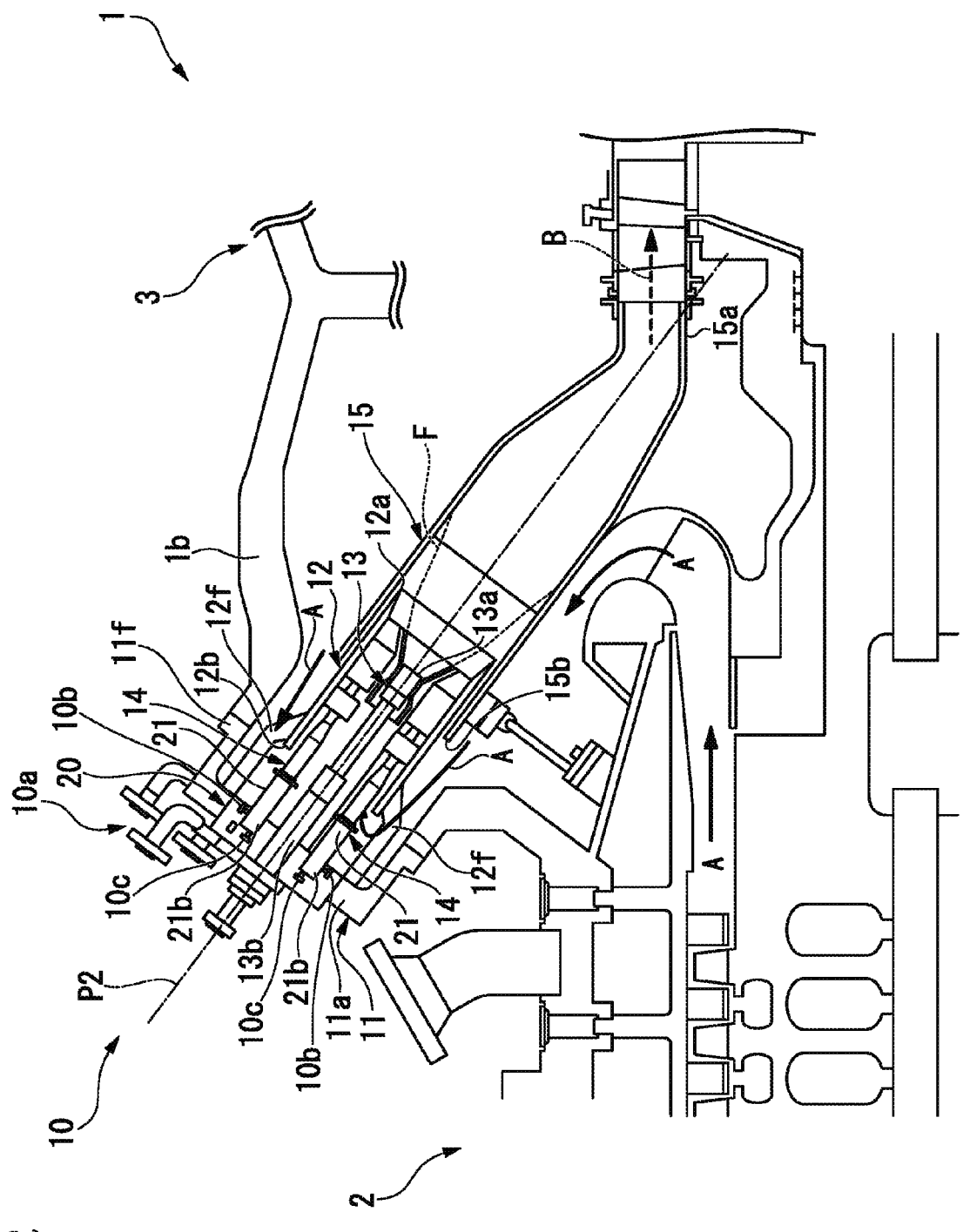
FIG. 2 is an enlarged cross-sectional view of a combustor 10 related to the first embodiment of the invention.

FIG. 2 is an enlarged cross-sectional view of the combustor 10.

As shown in FIG. 2, each combustor 10 includes an external cylinder 11, a combustor basket 12, a main nozzle (a first nozzle) 14, a pilot nozzle (a second nozzle) 13, and a transition piece 15.

In the external cylinder 11, the center axis thereof overlaps the combustor center axis P2 and a flange 11f extending radially outward from the outer periphery on one end side in an axial direction is fixed to a casing 1b. A fuel feeder 10a that supplies fuel to the main nozzle 14 and a nozzle cylinder stand 20 supporting the main nozzle 14 are disposed on a base end portion 11a side on the other end side in the axial direction of the external cylinder 11.

The combustor basket 12 is formed so as to have a smaller diameter than the external cylinder 11 and the center axis thereof overlaps the combustor center axis P2. The combustor basket 12 is fixed to the external cylinder 11 through a supporter 12f extending from a base end opening portion 12b side, and the like.

The gap between the combustor basket 12 and the external cylinder 11 forms a flow path of the compressed air A, as shown in FIG. 2, and the compressed air A is introduced from the base end opening portion 12b on the base end portion 11a side of the external cylinder 11 into the inside of the combustor basket 12.

The pilot nozzle 13 is formed in an elongated shape and disposed on the combustor center axis P2. A base end 13b side of the pilot nozzle 13 is supported on the nozzle cylinder stand 20 and the like, and a leading end 13a side of the pilot nozzle 13 is surrounded by the combustor basket 12. A pilot flame is formed on the leading end 13a side of the pilot nozzle 13 by the fuel supplied from the fuel feeder 10a to the base end 13b side. In addition, the fuel feeder 10a may be configured to include a fuel supply path 10b formed in the periphery on the base end 21b side of a main nozzle body 21 and a fuel supply path 10c formed in the bottom on the base end 21b side of the main nozzle body 21, as necessary.

A plurality of (for example, eight) main nozzles 14 is annularly disposed at equal pitch along the inner periphery of the combustor basket 12. The plurality of main nozzles 14 is disposed such that the nozzle center axis P3 (refer to FIG. 3) of each nozzle is parallel to the combustor center axis P2 of the combustor 10.

Figure 3:
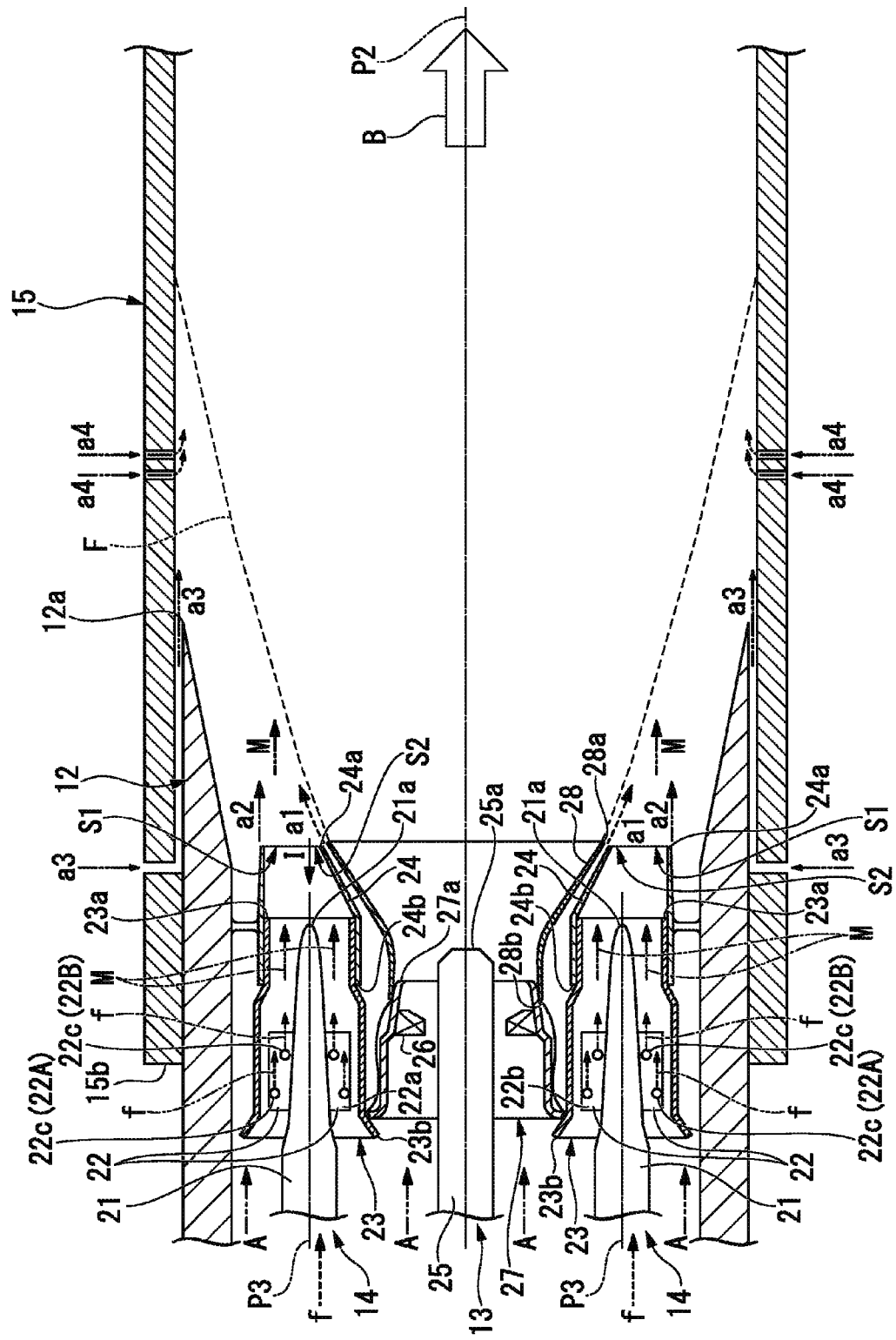
FIG. 3 is an enlarged cross-sectional view of a main section of the combustor 10 related to the first embodiment of the invention.
Figure 4:
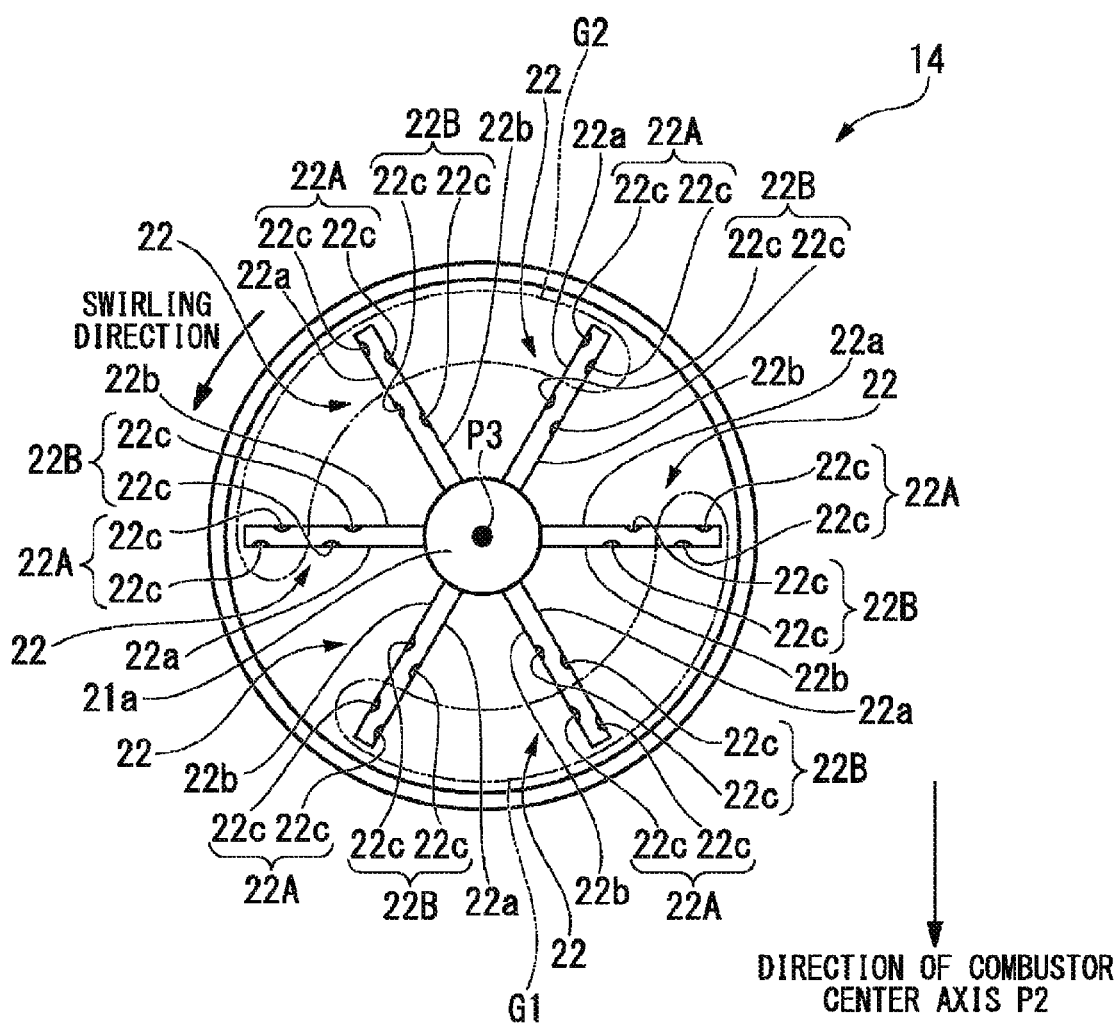
FIG. 4 is an enlarged view of a main section related to the first embodiment of the invention and is a view in the direction of arrow 1 in FIG. 3

FIG. 3 is an enlarged cross-sectional view of a main section of the combustor 10 and FIG. 4 is a view in the direction of arrow 1 in FIG. 3.

As shown in FIG. 3, each main nozzle 14 includes the main nozzle body 21, a plurality of main swirler blades 22, a main nozzle cylinder 23, and an extension pipe 24. Further, the pilot nozzle 13 includes a pilot nozzle body 25, a plurality of pilot swirler blades 26, a pilot nozzle cylinder 27, and a pilot cone 28.

The main nozzle body 21 is formed in an elongated shape, as shown in FIG. 2, and is located on the nozzle center axis P3. The main nozzle body 21 is supported on the nozzle cylinder stand 20 at the base end 21b side, as shown in FIG. 2, and has, in the inside thereof, a fuel flow path connected to the fuel feeder 10a.

A plurality of (in this embodiment, six) main swirler blades 22 is radially disposed on the periphery on the leading end 21a side of the main nozzle body 21, as shown in FIGS. 3 and 4, and forms a swirl flow of premixed gas M.

Fuel discharge sections 22A and 22B are disposed at each main swirler blade 22, as shown in FIG. 4.

Each of the fuel discharge sections 22A and 22B is constituted of a pair of fuel discharge holes 22c formed in a pressure surface 22a and a negative pressure surface 22b of the main swirler blade 22, and the fuel discharge section 22A is formed on the radially outward side of the main swirler blade 22 and the fuel discharge section 22B is formed on the radially inward side of the main swirler blade 22.

Each of the fuel discharge holes 22c communicates with the fuel flow path of the main nozzle body 21. The fuel discharge holes 22c are formed such that with respect to each of the fuel discharge sections 22A and 22B, the fuel discharge hole 22c formed in the pressure surface 22a is located on the radially outward side of the main swirler blade 22 and the fuel discharge hole 22c formed in the negative pressure surface 22b is located on the radially inward side of the main swirler blade 22.

Due to such a configuration, as shown in FIG. 3, the fuel discharge sections 22A and 22B discharge fuel f from the fuel discharge holes 22c, thereby generating the premixed gas M of the compressed air A and the fuel f.

The main nozzle cylinder 23 is disposed such that the center axis thereof overlaps the nozzle center axis P3, and each of a cylinder leading end opening 23a and a cylinder base end opening 23b faces in the axial direction. Then, the main nozzle cylinder 23 surrounds a leading end 21a of each main nozzle body 21 and the plurality of main swirler blades 22.

In the extension pipe 24, a pipe base end opening 24b side in the axial direction is connected to the cylinder leading end opening 23a of the nozzle cylinder 23. In a pipe leading end opening portion (a leading end outlet) 24a of the extension pipe 24, the cross-section of a flow path is gradually reduced as it extends from the pipe base end opening 24b side to the pipe leading end opening portion 24a side.

The extension pipe 24 makes cooling air a2 for a cooling film flow out from the radially outer peripheral wall side of the pipe leading end opening 24a.

Similarly to the pilot nozzle 13, the main nozzle 14 is surrounded by the combustor basket 12 at a leading end side where the main nozzle cylinder 23, the extension pipe 24 and the like are located.

The pilot nozzle 13 has the pilot nozzle cylinder 27 at the leading end 25a side of the pilot nozzle body 25 and an annular space is formed between the pilot nozzle cylinder 27 and the pilot nozzle body 25. Then, the pilot swirler blade 26 is disposed between the cylindrical pilot nozzle cylinder 27 and the pilot nozzle body 25, and the pilot swirler blade 26 forms a swirl flow of the compressed air A.

A base end opening 28b of the pilot cone 28 is connected to a leading end opening 27a side of the pilot nozzle cylinder 27. In the pilot cone 28, a flow path area thereof is gradually increased as it extends from the base end opening 28b to a leading end opening 28a.

Further, a flow path of cooling air a1 is formed in the gap between the extension pipe 24 and the pilot cone 28, and the extension pipe 24 or the pilot cone 28 is cooled by the cooling air a1 flowing out from the flow path.

As shown in FIGS. 2 and 3, in the transition piece 15, a base end opening 15b is connected to a leading end opening portion 12a side of the combustor basket 12 and a leading end opening (a leading end in the axial direction) 15a communicates with the turbine 3. The transition piece 15 burns the premixed gas M supplied from the main nozzle 14, thereby forming the flame front F spreading to the radially outward toward the leading end opening 15a side.

As shown in FIG. 3, a flow path of cooling air a3 is formed in the gap between the transition piece 15 and the combustor basket 12, and the cooling air a3 flowing in from the flow path flows along the inner peripheral surface of the transition piece 15, thereby forming a cooling film. Further, as shown in FIG. 3, cooling air a4 also flows in from the downstream of the leading end opening portion 12a of the combustor basket 12.

In addition, in this embodiment, a case is described where, of the cooling air a1 to a4, the cooling air a1 flowing out from the gap between the extension pipe 24 and the pilot cone 28 is dominant in influence.

As described above, the main nozzle 14 supplies the premixed gas M of the compressed air A and the fuel f to the inside of the combustor basket 12. At that time, the main nozzle 14 supplies the premixed gas M with fuel concentration changed around the nozzle center axis P3 of the main nozzle 14 such that the flame front F has a uniform temperature in the axial direction.

In the pipe leading end opening 24a of the main nozzle 14, the fuel concentration in a second area S2 located radially inward of the inside of the combustor basket 12 is made relatively higher than in a first area S1 located radially outward of the inside of the combustor basket 12 (a side farther from the combustor center axis P2).

As a specific configuration, as shown in FIG. 4, of the six fuel discharge sections 22A, the fuel discharge quantity of Group G1 where the discharged fuel f reaches the first area S1 is reduced, and the fuel discharge quantity of Group G2 where the discharged fuel f reaches the second area S2 is increased.

More specifically, as shown in FIG. 4, the opening areas of the fuel discharge holes 22c are different between two fuel discharge sections 22A that are located on the radially inward of the combustor basket 12 and one fuel discharge section 22A adjacent to the two fuel discharge sections 22A in a turning direction (Group G1), and the remaining three fuel discharge sections 22A (Group G2).

In addition, the size of each fuel discharge holes 22c in the six fuel discharge sections 22B is the same.

As for the opening area of the fuel discharge hole 22c, when the diameter of the fuel discharge hole 22c belonging to the fuel discharge section 22B is taken as 1, the diameter of the fuel discharge hole 22c belonging to Group G1 is set to 0.9 and the diameter of the fuel discharge hole 22c belonging to Group G2 is set to 1.1.

In addition, the position, the number, and the size of the diameter of the fuel discharge holes 22c are determined according to the concentration distribution in the pipe leading end opening 24a.

In this manner, the fuel discharge quantities of the six fuel discharge sections 22A are divided into two kinds around the nozzle center axis P3 of the main nozzle 14. Further, in the same main swirler blade 22, the fuel discharge quantity is different between the fuel discharge section 22A on the radially outward side of the main nozzle body 21 and the fuel discharge section 22B on the inward side thereof.

Due to such a configuration, when pressure is applied to the fuel f in the fuel flow path of the main nozzle body 21, the amount of fuel f corresponding to the opening area is discharged from each fuel discharge hole 22c toward a flow of the compressed air A.

Next, an operation of the combustor 10 described above will be described.

When an operation of the gas turbine 1 is started, the compressor 2 generates the compressed air A. The compressed air A flows from the base end opening portion 12b of the combustor basket 12 of each combustor 10 into the inside of the combustor basket 12, as shown in FIG. 2.

The compressed air A flowing into the inside of the combustor basket 12 is partially used in the combustion of the pilot flame by the pilot nozzle 13 and partially flows into the main nozzle cylinder 23 of the main nozzle 14.

Each fuel discharge hole 22c discharges the amount of fuel f corresponding to the opening area to the compressed air A flowing into the main swirler blade 22. Then, the fuel f discharged and the compressed air A are mixed by the main swirler blade 22, whereby the premixed gas M is generated and also a swirl flow of the premixed gas M is formed.

When the premixed gas M has reached the pipe leading end opening 24a of the extension pipe 24, the concentration in the first area S1 is relatively low and the concentration in the second area S2 is relatively high.

The premixed gas M flowing out from the pipe leading end opening 24a forms the flame front F, as shown in FIG. 3.

More specifically, as the premixed gas M flows to the downstream in the direction of the combustor center axis P2 of the combustor 10, the premixed gas M on the inward side (the combustor center axis P2 side) of the combustor basket 12 burns more on the radially inward side in an upstream area. In other words, the premixed gas M on the radially outward side of the combustor basket 12, reaches a further downstream area and also burns further on the radially outward side.

That is, the premixed gas M flowing out from the cylinder leading end opening 23a burns first in the second area S2 that is located inward of the combustor basket 12 and in which the fuel concentration is higher than that in the first area S1.

On the other hand, when the premixed gas M flows to the downstream, the cooling air a1 is mixed in the second area S2 during a period until the premixed gas M flows to the downstream area, and thus the fuel concentration that was relatively high at the pipe leading end opening 24a is diluted and becomes almost the same as the premixed gas in the first area S1.

In this way, an area in which the premixed gas M burns sequentially moves from the inward of the combustor basket 12 to the radially outward side, and the flame front F is formed by the premixed gas M having approximately the same fuel concentration in the axial direction. In the flame front F formed in this way, the flame temperature becomes uniform in the axial direction, and thus the generation of NOx becomes slight.

As described above, according to the combustor 10, since each main nozzle 14 supplies the premixed gas M with the fuel concentration changed around the nozzle center axis P3 such that the flame front F has a uniform temperature in the axial direction, it is possible to reduce the variance in the fuel concentration of the premixed gas M over the axial direction. Thus, even if the cooling air a1 is mixed in the premixed gas M, the flame front F is formed by the premixed gas M having uniform fuel concentration over the axial direction, and thus it is possible to suppress the combustion of the flame front F at a non-uniform temperature in the axial direction and also suppress the generation of NOx.

Figure 5:
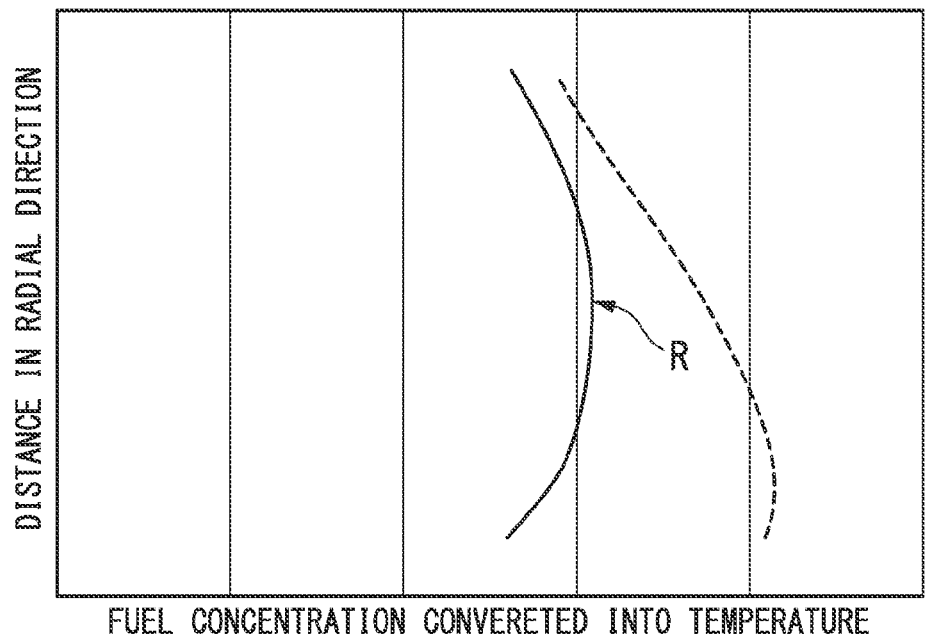
FIG. 5 is a diagram showing the fuel concentration of premixed gas M in the cross-section of FIG. 3 related to the first embodiment of the invention converted into temperature, and flame temperature at a flame front F of the premixed gas M which corresponds to the cross-section of FIG. 3, wherein a vertical axis shows a position in a radial direction from a nozzle center axis P3 and a horizontal axis shows fuel concentration converted into temperature.

FIG. 5 is a diagram showing the fuel concentration of the premixed gas M in the pipe leading end opening 24a of the main nozzle 14 converted into temperature, and flame temperature at the flame front F of the premixed gas M which corresponds to the cross-section of FIG. 3, wherein the vertical axis shows a position in the radial direction from the nozzle center axis P3 and the horizontal axis shows fuel concentration converted into temperature. In addition, in FIG. 5, a solid line represents flame temperature at the flame front F of the premixed gas M and a dashed line represents a value obtained by converting the fuel concentration of the premixed gas M in the pipe leading end opening 24a into temperature.

Figure 6:
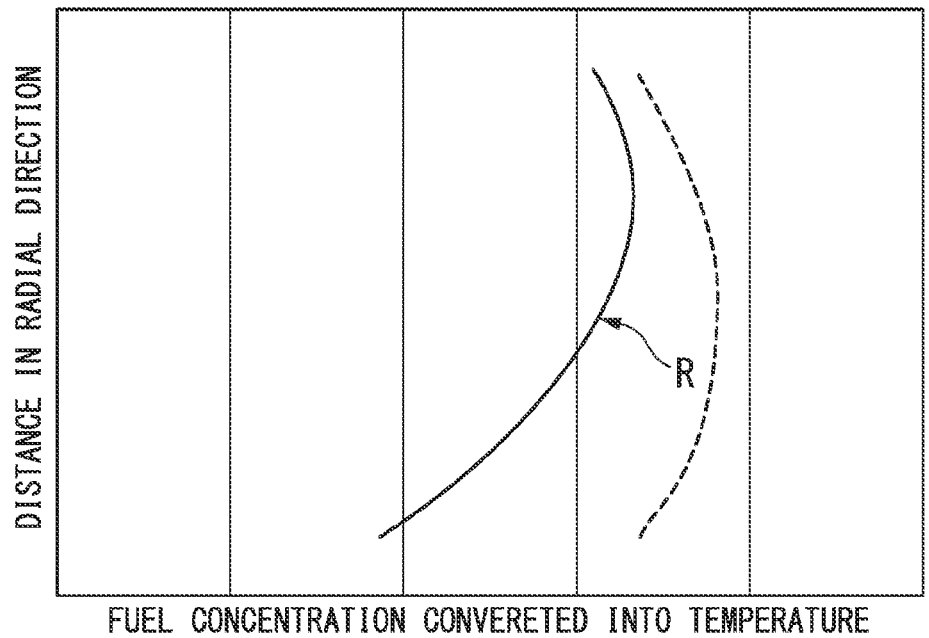
FIG. 6 is a comparative example of the combustor 10 related to the first embodiment of the invention and is equivalent to FIG. 5 showing the combustor 10.

Further, FIG. 6 is a comparative example in a case where all the opening areas of the fuel discharge holes 22c are made to be the same around the nozzle center axis P3 (the fuel discharge hole 22c of the fuel discharge section 22A has the same diameter as that of the fuel discharge hole 22c of the fuel discharge section 22B).

As in the comparative example, if the concentration distribution in the pipe leading end opening 24a is made to be substantially uniform by making all the opening areas of the fuel discharge holes 22c be the same around the nozzle center axis P3, a temperature peak R (the highest flame temperature) is generated in the flame front F on the radially outward of the combustor basket 12 as shown in a solid line in FIG. 6, and the flame temperature becomes locally high at this portion. On the other hand, the flame temperature is rapidly lowered toward the radially inward side from the temperature peak R.

This is because the fuel concentration of the premixed gas M on the radially inward side is more likely to decrease due to the cooling air a1.

On the other hand, in the combustor 10 according to the invention, in contrast with the comparative example, the concentration distribution in the pipe leading end opening 24a is not uniform, and the concentration in an area of the radially inward side of the combustor 10 is relatively higher than that of the radially outward side thereof as shown in FIG. 5. Further, in the combustor 10 according to the invention, in contrast with the comparative example, the flame temperature of the premixed gas in the flame front F becomes substantially uniform. In addition, in the combustor 10 according to the invention, compared to the comparative example, the temperature peak R becomes low, as shown by a solid line in FIG. 5. In this manner, in the combustor 10, since the combustion temperature becomes uniform on the whole and a local rise in flame temperature can be reduced, the generation of NOx is sufficiently suppressed.

Further, in the pipe leading end opening 24a of the main nozzle 14, the fuel concentration in the second area S2 located radially inward of the inside of the combustor basket 12 is made relatively higher than that in the first area S1 located radially outward of the inside of the combustor basket 12. That is, the fuel concentration of the premixed gas in the first area S1 of which the fuel concentration is relatively less likely to decrease and which burns on the downstream side is set to be low, and the fuel concentration of the premixed gas in the second area S2 of which the fuel concentration is more likely to decrease and which burns on the upstream side is set to be high. In this way, it is possible to make the fuel concentration of the premixed gas M that reaches the flame front F uniform in the axial direction with a relatively simple configuration.

Further, since the fuel discharge quantities of the fuel discharge sections 22A respectively formed at the six main swirler blades 22 are divided into two kinds around the nozzle center axis P3, the fuel concentration of the premixed gas M can be easily changed around the nozzle center axis P3 so as to correspond to the second area S2 of which the premixed gas burns at an early stage after flowing out from the pipe leading end opening 24a, and the first area S1 of which the premixed gas flows to the downstream area and burns with a delay.

Further, since the fuel discharge quantity is varied at the fuel discharge section 22A on the radially outward of the main nozzle 14 and the fuel discharge section 22B on the inward side in the same main swirler blade 22, the fuel concentration of the premixed gas M can be adjusted easily and appropriately in the radial direction.

Further, since the opening areas of the fuel discharge holes 22c are different, it is possible to change the fuel concentration of the premixed gas M by changing a fuel discharge quantity with a relatively simple configuration.

In addition, according to the gas turbine 1, since the combustor 10 is provided, a configuration can be obtained in which the generation of NOx is suppressed.

(Second Embodiment)

In the first embodiment, a case has been described where the influence of the cooling air a1 that flows out from the gap between the extension pipe 24 and the pilot cone 28 is dominant. However, in the second embodiment, a case will be described where the influence of cooling air on the radially outward of the combustor basket, such as the cooling air a2 for the cooling film from the radially outer peripheral wall side of the pipe leading end opening 24a of the extension pipe 24, the cooling air a3 flowing in from the flow path of the gap between the transition piece 15 and the combustor basket 12, and the cooling air a4 flowing in from the downstream of the leading end opening 12a of the combustor basket 12, is dominant. Therefore, with respect to the same configuration as that in the first embodiment, a description thereof is omitted here.

In this embodiment, in the pipe leading end opening 24a of the main nozzle 14, the fuel concentration in the first area S1 located radially outward of the inside of the combustor basket 12 is made relatively higher than that of the premixed gas in the second area S2 located radially inward of the inside of the combustor basket 12 (a side coming closer to the combustor center axis P2).

As a specific configuration, in FIG. 4, of the six fuel discharge sections 22A, the fuel discharge quantity of Group G1 where the fuel f discharged reaches the first area S1 is increased, and the fuel discharge quantity of Group G2 where the fuel f discharged reaches the second area S2 is reduced.

In addition, the position, the number, and the size of the diameter of the fuel discharge holes 22c are determined according to the concentration distribution in the pipe leading end opening 24a.

Next, an operation of the combustor 10 described above will be described.

When the premixed gas M has reached the pipe leading end opening 24a of the extension pipe 24, the concentration in the first area S1 is relatively high and the concentration in the second area S2 is relatively low.

That is, the premixed gas M flowing out from the cylinder leading end opening 23a burns first in the second area S2 located inward of the combustor basket 12 in which the fuel concentration became low compared to that of the first area S1.

On the other hand, when the premixed gas M flows to the downstream, the cooling air a2 to a4 is mixed in the first area S1 during the period until the premixed gas M flows to the downstream area, and thus the fuel concentration that was relatively high at the pipe leading end opening 24a is diluted and becomes almost the same as that of the second area S2.

In this way, an area in which the premixed gas M burns sequentially moves from the inward of the combustor basket 12 to the radially outward side, and the flame front F is formed by the premixed gas M having approximately the same fuel concentration in the axial direction.

In the flame front F formed in this say, the flame temperature becomes uniform in the axial direction, and thus the generation of NOx becomes slight.

As described above, according to the combustor 10, since each main nozzle 14 supplies the premixed gas M with the fuel concentration changed around the nozzle center axis P3 such that the flame front F has a uniform temperature in the axial direction, it is possible to reduce the variance in the fuel concentration of the premixed gas M over the axial direction.

Thus, even if the cooling air a2 to a4 is mixed in the premixed gas M, the flame front F is formed by the premixed gas M having uniform fuel concentration over the axial direction, and thus it is possible to suppress the combustion of the flame front F at a non-uniform temperature in the axial direction and also suppress the generation of NOx.

Figure 7:
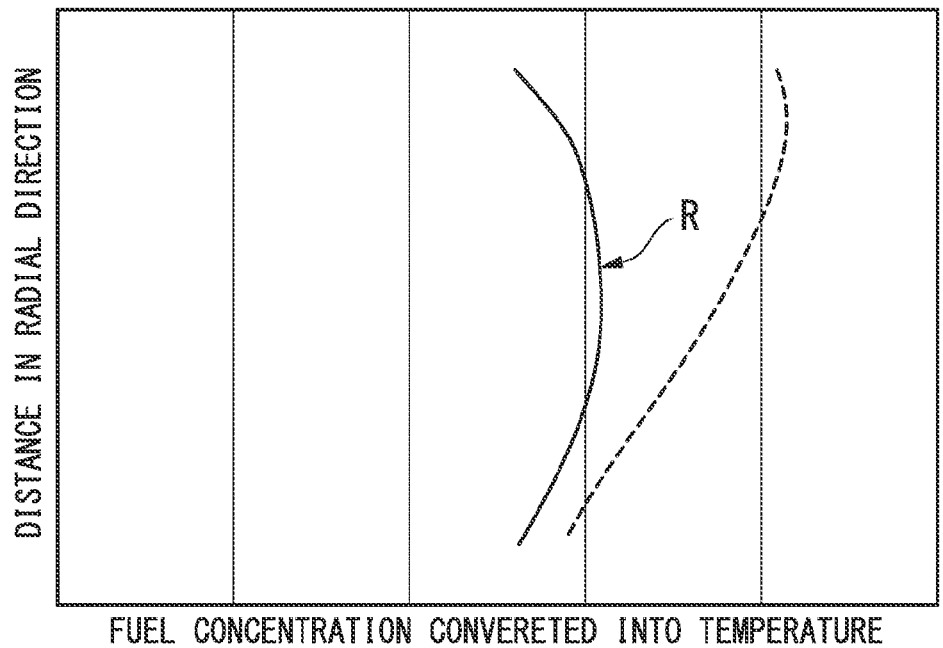
FIG. 7 is a diagram showing the fuel concentration of the premixed gas M in the cross-section of FIG. 3 related to a second embodiment of the invention converted into temperature, and flame temperature at the flame front F of the premixed gas M which corresponds to the cross-section of FIG. 3, wherein a vertical axis shows a position in a radial direction from the nozzle center axis P3 and a horizontal axis shows fuel concentration converted into temperature.

FIG. 7 is a diagram showing the fuel concentration of the premixed gas M in the radial direction in the pipe leading end opening 24a converted into temperature, and flame temperature at the flame front F of a corresponding premixed gas M, wherein a solid line represents flame temperature at the flame front F of the premixed gas M and a dashed line represents a value obtained by converting the fuel concentration of the premixed gas M in the pipe leading end opening 24a into temperature.

Figure 8:
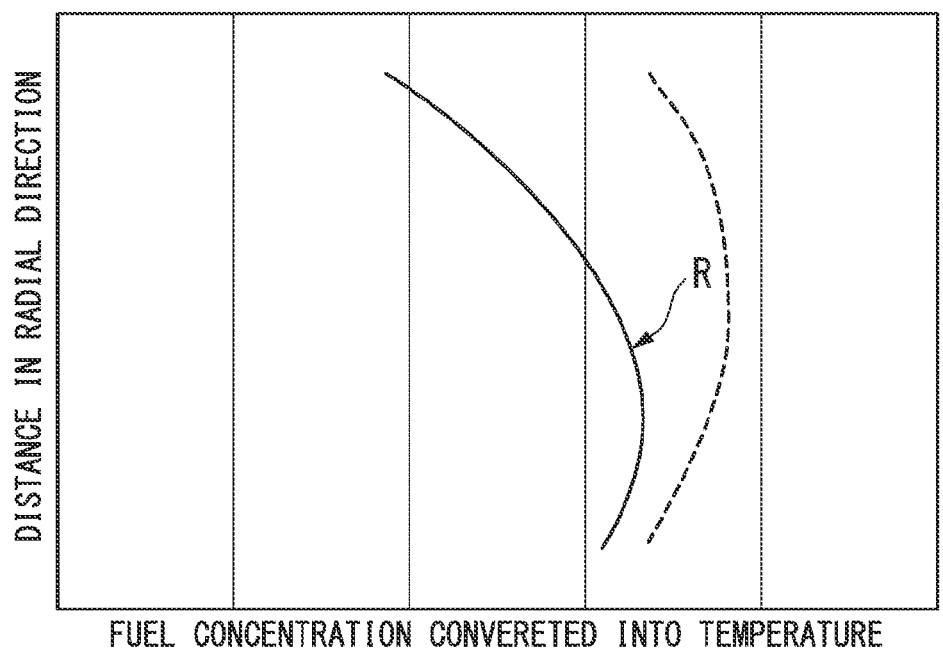
FIG. 8 is a comparative example of a combustor 10 related to the second embodiment of the invention and is equivalent to FIG. 7 showing the combustor 10.

Further, FIG. 8 is a comparative example in a case where all the opening areas of the fuel discharge holes 22c are made to be the same around the nozzle center axis P3 (the fuel discharge hole 22c of the fuel discharge section 22A has the same diameter as that of the fuel discharge hole 22c of the fuel discharge section 22B).

As in the comparative example, if the fuel concentration in the pipe leading end opening 24a is made to be substantially uniform by making all the opening areas of the fuel discharge holes 22c be the same around the nozzle center axis P3, a temperature peak R (the highest flame temperature) is generated in the flame front F on the radially outward of the combustor basket 12 as shown by a solid line in FIG. 8, and the flame temperature becomes locally high at this portion. On the other hand, the flame temperature rapidly decreases toward the radially outward side from the temperature peak R.

This is because the fuel concentration of the premixed gas M on the radially outward side is more likely to decrease due to the cooling air a2 to a4.

On the other hand, in the combustor 10 according to the invention, in contrast with the comparative example, the concentration distribution in the pipe leading end opening 24a is not uniform and the concentration on the radially outward side is relatively higher than the radially inward side as shown in FIG. 7. Further, in the combustor 10 according to the invention, in contrast with the comparative example, the flame temperature of the premixed gas in the flame front F becomes substantially uniform. In addition, in the combustor 10 according to the invention, compared to the comparative example, the temperature peak R becomes low, as shown by a solid line in FIG. 7. In this manner, in the combustor 10, since the combustion temperature becomes uniform on the whole and a local rise in flame temperature can be reduced, the generation of NOx is sufficiently suppressed.

Further, in the pipe leading end opening 24a of the main nozzle 14, the fuel concentration in the first area S1 located radially outward of the inside of the combustor basket 12 is made relatively higher than that of the premixed gas in the second area S2 located radially inward of the inside of the combustor basket 12. That is, the fuel concentration of the premixed gas in the first area S1 of which the fuel concentration is relatively more likely to decrease and which burns on the downstream side is set to be high, and the fuel concentration of the premixed gas in the second area S2 of which the fuel concentration is relatively less likely to decrease and which burns on the upstream side is set to be low.

In this way, it is possible to make the fuel concentration of the premixed gas M that reaches the flame front F uniform in the axial direction with a relatively simple configuration.

In addition, the operation procedure or the shapes, the combination, or the like of the respective constituent members shown in the embodiments described above are examples and can be variously changed based on design requirements or the like within a scope that does not depart from the gist of the invention.

As an example, in the embodiments described above, the fuel concentration is changed by varying the fuel discharge quantities by varying the opening areas of the fuel discharge holes 22c. However, alternatively, the fuel concentration may also be changed by varying the fuel discharge quantities by changing, for example, the number of fuel discharge holes 22c or supply pressure to each fuel discharge hole 22c. Alternatively, the fuel concentration may also be changed by an appropriate combination of these.

Hereinafter, a modified example of the first embodiment or the second embodiment of the invention will be described with reference to FIGS. 9 to 12.

Figure 9:
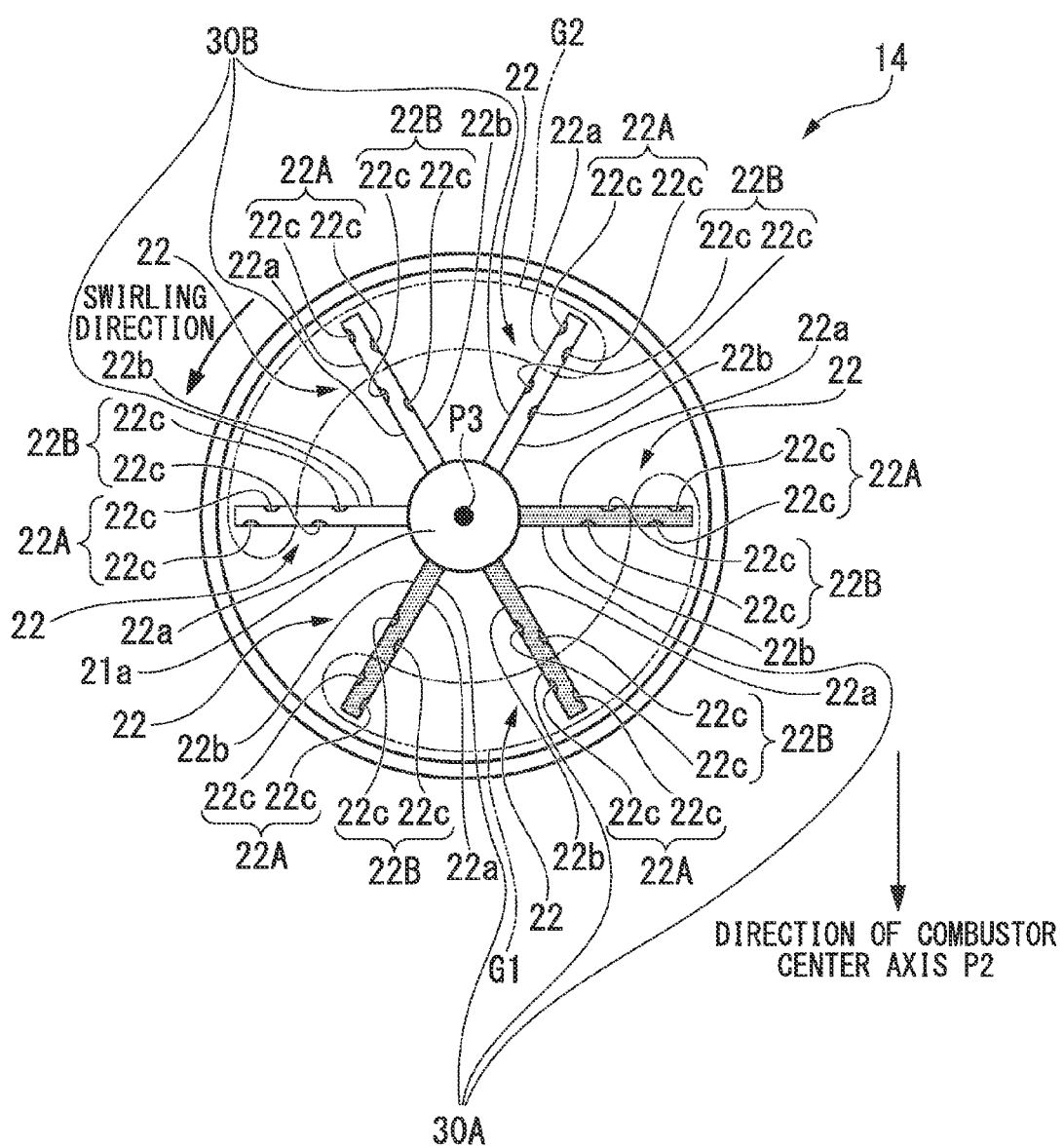
FIG. 9 is a diagram showing a main nozzle related to a modified example of the second embodiment of the invention and is a diagram as viewed from the direction of a center axis.

FIG. 9 is a diagram when the main nozzle 14 is viewed from the leading end side in the direction of the center axis. Further, FIG. 10 is a front view showing the schematic configuration of the main nozzle 14, and FIGS. 11 and 12 respectively show cross-sectional views along line X-X and line Y-Y of the main nozzle 14 in FIG. 10.

In this modified example, as shown in FIG. 9, the main nozzle 14 includes a first fuel supply system and a second fuel supply system which are independent of each other, and the main nozzle body 21 has a fuel discharge hole 22c that communicates with the first fuel supply system and belongs to a first pressure section 30A (a shaded section) and a fuel discharge hole 22c that communicates with the second fuel supply system and belongs to a second pressure section 30B.

The discharge quantity of the fuel f that is discharged from the fuel discharge holes 22c of the first pressure section 30A and the discharge quantity of the fuel f that is discharged from the fuel discharge holes 22c of the second pressure section 30B can be respectively adjusted by adjusting the supply pressure of the fuel f in the first fuel supply system and the second fuel supply system. Since other components are the same as those in the first embodiment or the second embodiment, the same signs are used and a description thereof is omitted here.

Figure 10:
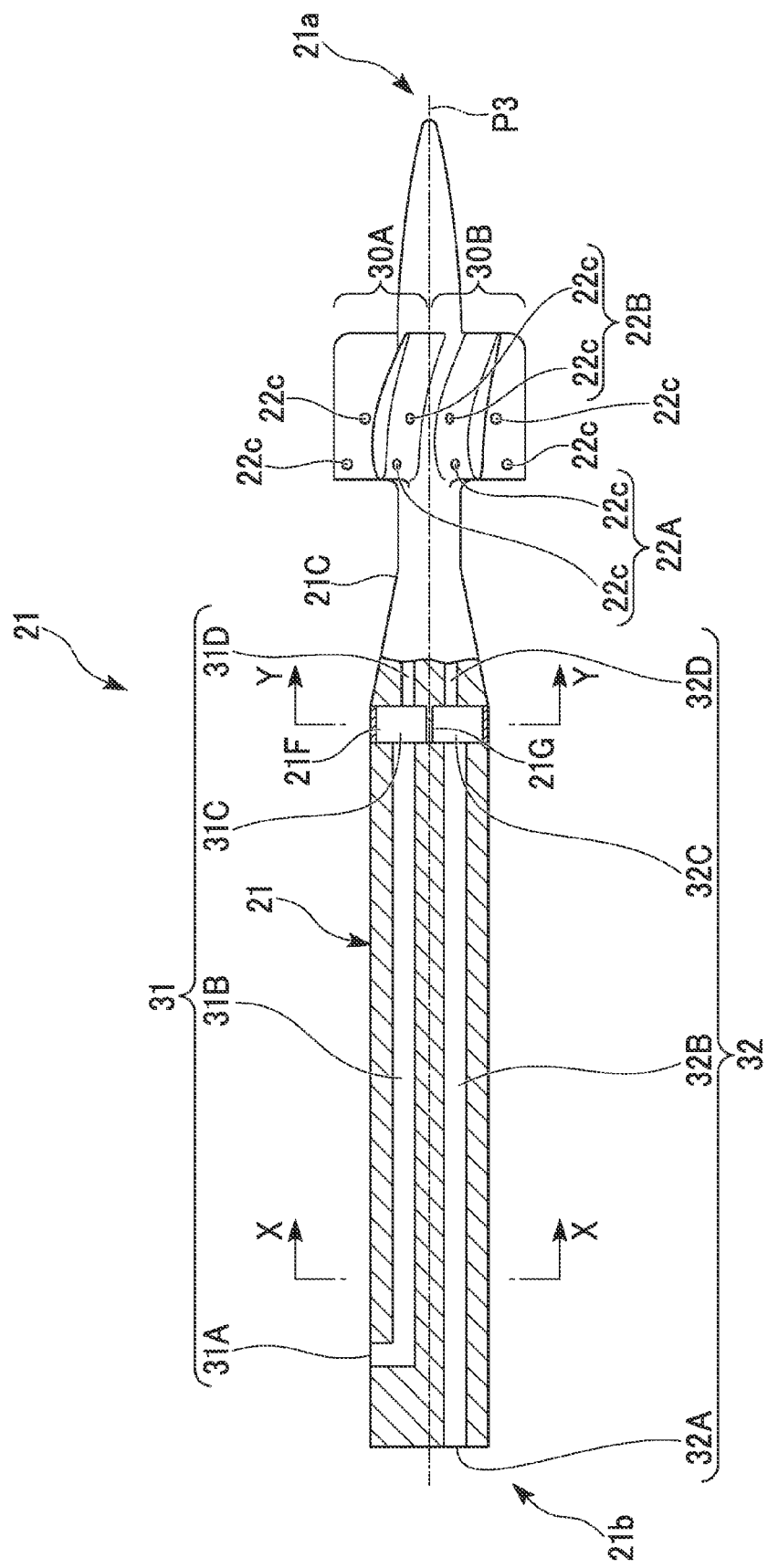
FIG. 10 is a front view showing the schematic configuration of the main nozzle related to the modified example of the second embodiment of the invention.
Figure 11:
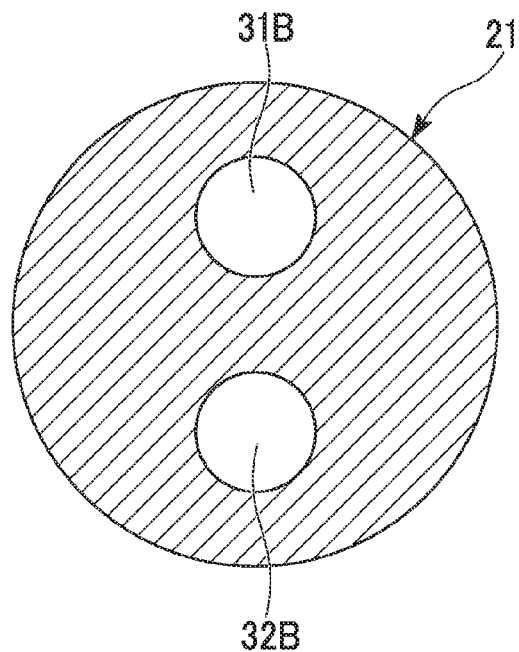
FIG. 11 is a diagram showing the main nozzle related to the modified example of the second embodiment of the invention and is a cross-sectional view along line X-X in FIG. 10.

Specifically, in the main nozzle body 21, as shown in FIGS. 9 and 10, among the plurality of (in this embodiment, six) main swirler blades 22 radially disposed at the outer periphery on the leading end 21a side of the main nozzle body 21, for example, three belong to the first pressure section 30A and the remaining three belong to the second pressure section 30B.

Further, the first pressure section 30A is configured to include Group G1 corresponding to the first area S1 and the second pressure section 30B is configured to include Group G2 corresponding to the second area S2.

In addition, the position, the number, and the size of the diameter of the fuel discharge holes 22c are determined according to the concentration distribution in the pipe leading end opening 24a.

In each main swirler blade 22, as shown in FIGS. 9 and 10, for example, the two fuel discharge holes 22c are formed on each of the pressure surface 22a and the negative pressure surface 22b, and the fuel discharge holes 22c formed in the pressure surface 22a are disposed further on the relatively radially outward side than the fuel discharge holes 22c formed in the negative pressure surface 22b.

Here, a pair of fuel discharge holes 22c located on the radially outward side in each of the pressure surface 22a and the negative pressure surface 22b of each main swirler blade 22 forms the fuel discharge section 22A.

Further, a pair of fuel discharge holes 22c located on the radially inward side in each of the pressure surface 22a and the negative pressure surface 22b of each main swirler blade 22 forms the fuel discharge section 22B.

The main nozzle body 21 has, in the inside thereof, a first fuel supply path 31 constituting the first fuel supply system and a second fuel supply path 32 constituting the second fuel supply system, as shown in FIG. 10, and the first fuel supply system and the second fuel supply system are independent in terms of pressure and are connected to the fuel feeder 10a.

The first fuel supply path 31 includes, for example, a first fuel supply port 31A, a first fuel flow path 31B, a fuel reservoir 31C, and a first branch path 31D. The first fuel supply port 31A is formed at a side portion of the main nozzle body 21 and the fuel reservoir 31C is branched to communicate with each fuel discharge hole 22c through the first branch path 31D.

Further, the second fuel supply path 32 includes, for example, a second fuel supply port 32A, a second fuel flow path 32B, a fuel reservoir 32C, and a second branch path 32D. The second fuel supply port 32A is formed in the end face on the base end 21b side of the main nozzle body 21 and the fuel reservoir 32C is branched to communicate with each fuel discharge hole 22c through the second branch path 32D.

Figure 12:
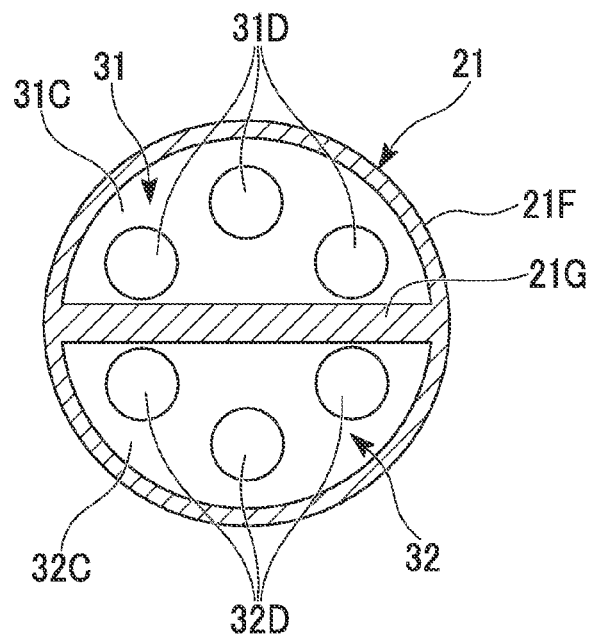
FIG. 12 is a diagram showing the main nozzle related to the modified example of the second embodiment of the invention and is a cross-sectional view along line Y-Y in FIG. 10.

The fuel reservoir 31C and the fuel reservoir 32C are adjacently disposed to be surrounded by a peripheral wall section 21F in the main nozzle body 21, as shown in FIGS. 10 and 12, and the fuel reservoir 31C and the fuel reservoir 32C are partitioned by a partition wall section 21G, and are thereby independent of each other in terms of pressure.

Further, by providing the fuel reservoir 31C and the fuel reservoir 32C, it is possible to stabilize the flow rate of the fuel f that is supplied to the fuel discharge holes 22c belonging to the first pressure section 30A and the flow rate of the fuel f that is supplied to the fuel discharge holes 22c belonging to the second pressure section 30B, and also easily perform communication of the first fuel flow path 31B and the second fuel flow path 32B with the corresponding fuel discharge holes 22c.

Further, in this modified example, as shown in FIG. 2, the first fuel supply port 31A is made such that the fuel f is supplied thereto from the fuel supply path 10b communicating with the fuel feeder 10a and formed in the periphery on the base end 21b side of the main nozzle body 21, and the second fuel supply port 32A is made such that the fuel f is supplied thereto from the fuel supply path 10c communicating with the fuel feeder 10a and formed in the bottom on the base end 21b side of the main nozzle body 21.

In this embodiment, the fuel feeder 10a is made so as to adjust the flow rate of the fuel f that is supplied to the first fuel supply path 31 and the second fuel supply path 32 by, for example, adjusting the setting of a parameter such as the supply pressure of the fuel f in the first fuel supply system and the second fuel supply system.

That is, in this modified example, a configuration is made such that the flow rate of the fuel f of the first fuel supply and the second fuel supply system, and eventually, the discharge quantity of the fuel f from the fuel discharge holes 22c belonging to the first pressure section 30A and the second pressure section 30B are adjusted by supplying the fuel f by the first fuel supply system and the second fuel supply system independent of the first fuel supply system and individually controlling the supply pressure of the first fuel supply system and the second fuel supply system.

For example, by making the supply pressure of the fuel discharge holes 22c belonging to the first pressure section 30A higher than that of the fuel discharge holes 22c belonging to the second pressure section 30B, the fuel discharge holes 22c belonging to Group G1 discharge a relatively larger amount of fuel f than the fuel discharge holes 22c belonging to Group G2, and thus, the fuel concentration of the premixed gas becomes higher in the first area S1 of the combustor basket 12 than the second area S2.

In addition, operation procedure or the shapes, the combination, or the like of the respective constituent members shown in the embodiments described above is an example and can be variously changed based on design requirements or the like within a scope that does not depart from the gist of the invention.

For example, in the above-described embodiments, a case has been described where the first area S1 is the radially inward of the inside of the combustor basket 12 and the second area S2 is the radially outward of the inside of the combustor basket 12. However, a configuration may be adopted in which, for example, the first area S1 is a portion of the radially outward of the inside of the combustor basket 12 and the second area S2 is a portion of the radially inward of the inside of the combustor basket 12, or the first area S1 and the second area S2 respectively constitute portions of the radially outward and inward of the inside of the combustor basket 12.

Further, for example, in the above-described embodiments, a case has been described where the main nozzle 14 includes two kinds of fuel discharge holes 22c; one kind of the fuel discharge holes 22c belonging to the first pressure section 30A corresponding to the first area S1 and the other kind of the fuel discharge holes 22c belonging to the second pressure section 30B corresponding to the second area S2. However, the present invention is not limited thereto.

For example, in such cases as where the premixed gas having a plurality of fuel concentrations is supplied to the radially outward of the inside of the combustor basket 12 by dividing an area on the radially outward of the inside of the combustor basket 12 of the premixed gas M generated in each main nozzle 14 into a plurality of areas that includes the first area S1, or by dividing the first area S1 into a plurality of areas having different fuel concentration, the fuel discharge hole 22c corresponding to the radially outward of the inside of the combustor basket 12 may be configured to communicate with an individual fuel supply system independent of the first pressure section 30A, in addition to the first pressure section 30A.

Further, for example, in such cases as where the premixed gas having a plurality of fuel concentrations is supplied to the radially inward of the combustor basket 12 by dividing an area on the radially inward of the inside of the combustor basket 12 of the premixed gas M generated in each main nozzle 14 into a plurality of areas that includes the second area S2, or by dividing the second area S2 into a plurality of areas having different fuel concentration, the fuel discharge hole 22c corresponding to the radially inward of the inside of the combustor basket 12 may be configured to communicate with an individual fuel supply system independent of the second pressure section 30B, in addition to the second pressure section 30B.

In addition, a plurality of independent fuel supply system may also be provided at each of both the radially outward side and the radially inward of the inside of the combustor basket 12.

Further, in the above-described embodiments, a case has been described where the main nozzle 14 is provided with three main swirler blades 22 belonging to Group G1 and the three main swirler blade 22 belonging to Group G2, and four fuel discharge holes 22c are formed in each of the main swirler blades 22 belonging to the first pressure section 30A and the second pressure section 30B. However, the present invention is not limited thereto.

For example, the number of main swirler blades 22 that the main nozzle 14 has, the number of main swirler blades 22 corresponding to Group G1 and Group G2, or the number of main swirler blades 22 corresponding to the first pressure section 30A and the second pressure section 30B can be arbitrarily set.

Further, the number of fuel discharge holes 22c that are formed in each main swirler blade 22 can also be arbitrarily set.

Further, in the above-described embodiments, a case has been described where the main nozzle 14 has six main swirler blades 22. However, for example, a configuration may be adopted in which the main nozzle 14 is not provided with the main swirler blade 22.

Further, in the above-described embodiments, a case has been described where there are an equal number of fuel discharge holes 22c belonging to the first pressure section 30A and fuel discharge holes 22c belonging to the second pressure section 30B which are disposed to correspond to each other and have equal respective opening areas. However, for example, any or all of the number, the disposition, and the opening areas of the fuel discharge holes 22c belonging to the first pressure section 30A and the fuel discharge holes 22c belonging to the second pressure section 30B may be set to be different.

Further, in the above-described embodiments, a case has been described where the first pressure section 30A is connected to the first fuel supply system, the second pressure section 30B is connected to the second fuel supply system, and the discharge quantity of the fuel f that is discharged from each fuel discharge hole 22c belonging to the first pressure section 30A and the second pressure section 30B is adjusted by controlling a parameter such as the pressure of the first fuel supply system and the second fuel supply system. However, for example, a configuration may be adopted in which the flow rate of the fuel f that is supplied by each fuel supply system is adjusted by the setting of the flow path area, the flow path resistance, or the like of each fuel supply system such as the first fuel supply port 31A, the second fuel supply port 32A, the first fuel flow path 31B, or the second fuel flow path 32B.

Further, in the above-described embodiments, a case has been described where the first fuel supply path 31 includes the first fuel supply port 31A, the first fuel flow path 31B, the fuel reservoir 31C, and the first branch path 31D. However, it goes without saying that the present invention is not limited to the above configuration. The same applies to the second fuel supply path 32.

Further, the supply quantity of the fuel f may also be adjusted by the setting of the number or the opening area of each fuel discharge hole 22c belonging to the first pressure section 30A and the second pressure section 30B.

Further, the fuel concentration may also be changed by an appropriate combination of these.

Further, in the embodiments described above, a configuration has been shown in which in the combustor 10 where the main nozzles 14 are disposed at intervals along the inner peripheral surface of the combustor basket 12, the pilot flame is formed by the pilot nozzle 13 that is disposed on the combustor center axis P2, thereby igniting the premixed gas from the main nozzle 14 to perform premixed combustion. However, the present invention is not limited to this configuration. For example, it is also possible to apply the invention to a combustor which includes a plurality of first nozzles that is disposed at intervals along the inner peripheral surface of a combustor basket and a second nozzle that is disposed on a combustor center axis, and in which the first and second nozzles can independently perform the premixed combustion.

INDUSTRIAL APPLICABILITY

According to the combustor related to the invention, the generation of NOx can be suppressed.

According to the gas turbine related to the invention, a gas turbine in which the generation of NOx is suppressed can be configured.

REFERENCE SIGNS LIST

1: gas turbine
10: combustor
12: combustor basket
14: main nozzle (first nozzle)
15: transition piece
15a: leading end opening (leading end in an axial direction)
15b: base end opening (base end)
22: main swirler blade (swirler blade)
22A, 22B: fuel discharge section
22c: fuel discharge hole
24a: pipe leading end opening (leading end outlet)
P2: combustor center axis
P3: nozzle center axis (center axis of a main nozzle)
S1: first area
S2: second area
A: compressed air (air)
F: flame front
M: premixed gas
f: fuel

The invention claimed is:

1. A combustor, comprising:
   a combustor basket which is configured to receive air from the an outside of the combustor;
   a plurality of first nozzles that are provided along an inner periphery of the combustor basket and that extend in an axial direction of the combustor basket;
   a second nozzle that is arranged at a center of the combustor basket and that extends in an axial direction of the combustor basket; and
   a transition piece that is connected to the combustor basket and that is configured to allow high-temperature combustion gas to flow inside of the transition piece, wherein
   each of the first nozzles has fuel discharge holes and is surrounded by a first nozzle pipe which is configured to mix the air and fuel discharged from the fuel discharge holes forming a premixed gas,
   the second nozzle has fuel discharge holes and is surrounded by a second nozzle pipe, a gap is provided between the first nozzle pipe and the second nozzle pipe, which is configured to provide cooling air into combustion zone,
   cooling air is configured to flow around the first nozzles, the second nozzle, combustor basket and the transition piece,
   an area located near the outlet of the first nozzles, which is positioned inside the combustor basket, includes a first area near a radially outer periphery of the first nozzles receiving the cooling air and a second area near a radially inner periphery of the first nozzles located radially inward with respect to the first area, and which receives the cooling air from the gap, radially being defined relative to a combustor axis, and
   wherein a flow amount of the cooling air in the second area is larger than a flow amount of the cooling air in the first area, the first nozzles are configured such that, in the first nozzle pipes at their outlets, a fuel concentration of the premixed gas in the second area is relatively higher than that in the first area, and mixing of the cooling air with the premixed gas in the first area and second area promoting relatively uniform flame temperature.

2. The combustor according to claim 1, wherein said first nozzle pipe includes a main nozzle cylinder and an extension pipe connected to the main nozzle cylinder.

3. The combustor according to claim 1, wherein said second nozzle pipe includes a pilot nozzle cylinder and a pilot cone connected to the pilot nozzle cylinder.

4. The combustor according to claim 1, wherein:
   each of the first nozzles includes a first swirler blade extending radially on a periphery of the first nozzle, and each of the first swirler blades includes a fuel discharge hole formed on a radially inward side of the first swirler blade and a fuel discharge hole formed on a radially outward side of the first swirler blade; and
   each of the first nozzles supplies a premixed gas with fuel concentration adjusted around a center axis of the first nozzle such that a flame front has uniformity in temperature in an axial direction based on: a discharge quantity of the fuel being adjusted by opening areas of the fuel discharge holes formed on the radially inward side and the fuel discharged holes formed on the radially outward side differing from each other.

5. A combustor, comprising:
   a combustor basket which is configured to receive air from an outside of the combustor;
   a plurality of first nozzles that are provided along an inner periphery of the combustor basket and that extend in an axial direction of the combustor basket; and
   a transition piece that is connected to the combustor basket and that is configured to allow high-temperature combustion gas to flow inside of the transition piece, wherein
   each of the first nozzles has fuel discharge holes and is surrounded by a first nozzle pipe which is configured to mix the air and fuel discharged from the fuel discharge holes forming a premixed gas,
   a gap is provided between the transition piece and the combustor basket, which is configured to provide cooling air into combustion zone,
   cooling air is configured to flow around the first nozzles, combustor basket, and the transition piece,
   an area located near the outlet of the first nozzles, which is positioned inside the combustor basket, includes a first area near a radially outer periphery of the first nozzles receiving the cooling air and a second area near a radially inner periphery of the first nozzles located radially inward with respect to the first area and which also receives the cooling air, radially being defined relative to a combustor axis, and
   wherein a flow amount of the cooling air in the second area is larger than a flow amount of the cooling air in the first area, the first nozzles are configured such that, in the first nozzle pipes at their outlets, a fuel concentration of the premixed gas in the second area is relatively higher than that in the first area, and mixing of the cooling air with the premixed gas in the first area and second area promoting relatively uniform flame temperature.

6. The combustor according to claim 5, wherein another gap is provided between an outer surface of the first nozzle pipe and an inner surface of the combustor basket, which is configured to provide the cooling air into the combustion zone.

7. The combustor according to claim 5, wherein the transition piece includes a penetrating hole on its wall, which are configured to provide the air into the combustion zone.

8. The combustor according to claim 7, wherein the penetrating hole is located upstream of a flame front.

9. The combustor according to claim 5, wherein:
each of the first nozzles includes a first swirler blade extending radially on a periphery of the first nozzle, and each of the first swirler blades includes a fuel discharge hole formed on a radially inward side of the first swirler blade and a fuel discharge hole formed on a radially outward side of the first swirler blade; and
each of the first nozzles supplies a premixed gas with fuel concentration adjusted around a center axis of the first nozzle such that a flame front has uniformity in temperature in an axial direction based on: a discharge quantity of the fuel being adjusted by opening areas of the fuel discharge holes formed on the radially inward side and the fuel discharged holes formed on the radially outward side differing from each other.

* * * * *